UNITED STATES PATENT OFFICE.

EMIL ARNOLD AND RICHARD ARNOLD, OF LEIPSIC-PLAGWITZ, GERMANY.

COMPOSITION FOR TREATING LITHOGRAPHIC STONES AND PLATES.

SPECIFICATION forming part of Letters Patent No. 504,772, dated September 12, 1893.

Application filed November 10, 1892. Serial No. 451,556. (No specimens.)

*To all whom it may concern:*

Be it known that we, EMIL ARNOLD and RICHARD ARNOLD, both subjects of the King of Saxony, and residents of Leipsic-Plagwitz, in the Kingdom of Saxony, Empire of Germany, have invented a new and useful Composition of Matter for Treating Lithographic Stones and Plates, of which the following is a full, clear, and exact specification.

Our invention relates to a composition of matter for preparing lithographic stones and plates for printing by washing the same with this composition, and our object is to provide a liquid which will effectively remove the ink and grease from said stones and plates, and thus to afford a convenient substitute for the usual method of preparing lithographic stones and plates by grinding the same.

Our improved liquid is composed of bioxalate of potash, pulverized pumice-stone, alum, chloride of magnesium, strong vinegar, water, and sulphuric ether. The proportions which we prefer to employ are: four parts (by volume) of pulverized bioxalate of potash, six parts of pulverized pumice-stone, ten parts of pulverized alum, seven parts of chloride of magnesium, thirty-three parts of strong vinegar (containing seven per cent. of acetic acid), thirty-six parts of water, and four parts of sulphuric ether. Before using the mixture, it should be strongly agitated in order to prevent the ingredients from being poured out one after the other according to their specific weight.

The liquid is employed in the following manner: The surface of the stone or plate is first washed with turpentine oil or with a similar oil, in order to remove the ink. Then the liquid, composed as above, is poured on the plate and the latter rubbed on its whole surface with a piece of felt or of another fabric. This operation will last from two to three minutes, according to the size of the plate. The various substances which may still adhere to the latter, such as grease, glue, acid compounds, traces of ink, are entirely removed by this treatment. Then the plate is thoroughly rinsed with pure water, and when dry may be used immediately for another impression.

What we claim, and desire to secure by Letters Patent of the United States, is—

A composition of matter for preparing lithographic stones and plates, consisting of bioxalate of potash, pumice-stone, alum, chloride of magnesium, strong vinegar, sulphuric ether, and water, substantially as and for the purpose described, and in the proportions specified.

In testimony whereof we have signed this specification in the presence of two subscribing witnesses.

EMIL ARNOLD.
RICHARD ARNOLD.

Witnesses:
O. LÄSSIG,
CARL BORNGRABER.